United States Patent [19]

Welschof

[11] Patent Number: 5,125,873

[45] Date of Patent: Jun. 30, 1992

[54] PLUNGING CONSTANT VELOCITY RATIO UNIVERSAL JOINT

[75] Inventor: Hans-Heinrich Welschof, Rodenbach, Fed. Rep. of Germany

[73] Assignee: Löhr & Bromkamp GmbH, Offenbach am Main, Fed. Rep. of Germany

[21] Appl. No.: 483,638

[22] Filed: Feb. 23, 1990

[30] Foreign Application Priority Data

Feb. 23, 1989 [DE] Fed. Rep. of Germany ....... 3905566

[51] Int. Cl.⁵ ............................................... F16D 3/26
[52] U.S. Cl. .................................. 464/111; 464/167; 464/168; 464/905
[58] Field of Search ........ 464/168, 111, 139, 141–146, 464/152, 905, 120, 167

[56] References Cited

U.S. PATENT DOCUMENTS 4,112,709  9/1978  Krude ............................. 464/145 X
4,741,723  5/1988  Orain ................................. 464/111
4,828,534  5/1989  Orain ................................. 464/111

Primary Examiner—Daniel P. Stodola
Assistant Examiner—William G. Battista. Jr.
Attorney, Agent, or Firm—Akoo-Toren

[57] ABSTRACT

A plunging constant velocity ratio universal joint comprising an outer joint member (1) with three circumferentially spaced pairs of tracks (19, 20) in its interior, an inner joint member (3) with outwardly extending pairs of limbs (17, 18) with opposed part-cylindrical surfaces (17a, 18a), and three intermediate members each with a part-spherical portion (2) received between the surfaces (17a, 18a) of the limbs, and projections (10, 11) extending in opposite directions therefrom. Each projection has a pair of oppositely disposed tracks (13, 14, 15, 16) facing the tracks in the outer joint member, at least two rolling members (5, 6, 7, 8) engaging in the facing tracks of the projections and outer joint member, and respective cage (4) for constraining the rolling members of each intermediate member relative to one another.

15 Claims, 5 Drawing Sheets

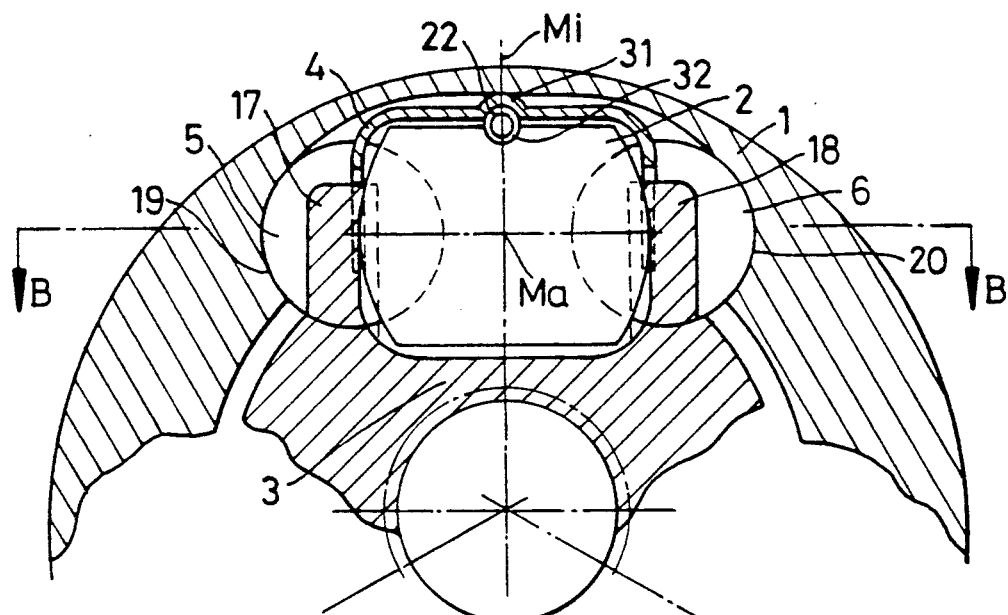
Fig. 4A
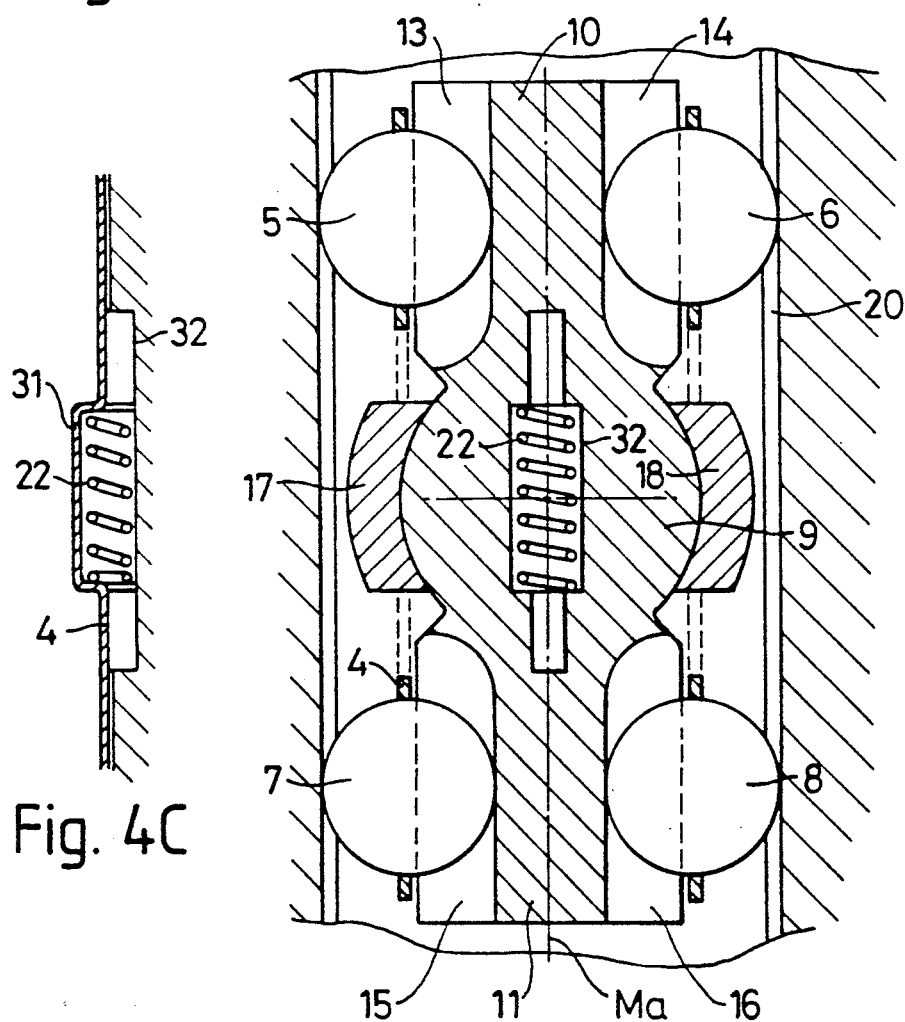
Fig. 4C
Fig. 4B

PLUNGING CONSTANT VELOCITY RATIO UNIVERSAL JOINT

BACKGROUND TO THE INVENTION

1. Field of the Invention

This invention relates to a plunging constant velocity ratio universal joint, comprising an outer joint member generally in the form of a sleeve, having in its interior three pairs of tracks, the pairs being equally spaced circumferentially about and extending parallel or substantially parallel to the rotational axis of the outer joint member, and an inner joint member with parts extending radially outwardly relative to its axis into the track pairs of the outer joint member, with rolling members supported on said parts of the inner joint member and engaging the track pairs in the outer member to effect transmission of torque between the joint members and to enable the joint members to articulate and move axially relative to one another.

2. Description of the Prior Art

A joint of the kind above set forth is disclosed in DE-3741049, wherein the inner joint member has outwardly extending pin parts with spherical surfaces, on which are supported intermediate members and rolling members in the form of caged assemblies of needles. Such a joint performs satisfactorily, but is relatively expensive to manufacture.

SUMMARY OF THE INVENTION

It is broadly the object of the present invention to provide a constant velocity ratio universal joint of the kind specified which is economical to produce, but which has a relatively low resistance to relative axial movement (plunging) between the joint members and, when operating under load in the articulated condition, does not generate unacceptable axial vibrations.

According to the present invention, we provide a constant velocity ratio universal joint of the kind specified wherein each of the radially outwardly extending parts of the inner joint member comprises a pair of limbs having opposed part-cylindrical surfaces between which is received a part-spherical portion of a respective intermediate member for radial movement and articulation relative to the inner joint member, the intermediate member having projections extending in opposite directions axially of the outer joint member from its part-spherical portion and each projection having a pair of oppositely disposed tracks facing the tracks of the respective pair thereof in the outer joint member, and at least two rolling members for each projection and engaging in the facing tracks of the projections and outer joint member, the rolling members being constrained relative to one another by a cage.

In a joint according to the invention, all the rolling members associated with one of the pairs of tracks in the outer joint member are supported on the associated intermediate member which is in one piece and is a relatively uncomplicated and easily manufactured shape, comprising only its portion with the part-spherical surfaces engaging the limbs of the inner joint member, and the projections and associated tracks extending therefrom. Further, the inner joint member is of relatively simplified shape since it does not require three part-spherical portions; it merely requires the pairs of limbs with their opposed part-cylindrical surfaces. The part-spherical portions of the intermediate members in the joint can be guided between such part-cylindrical surfaces with very little free play. Similarly the rolling members can engage in the tracks in the outer joint member and the intermediate member with very little play.

In the simplest embodiment of joint according to the invention, the rolling members may comprise four balls associated with each intermediate element, i.e. disposed one on each side of each projection of the intermediate member, and such balls may be of relatively large diameter to give the joint adequate torque capacity. The balls may be held appropriately spaced from one another by a cage which is generally of U-shape in cross-section, to embrace the intermediate member, and having cutout portions to accommodate the limbs of the inner joint member.

Sliding bearing elements may be interposed between the opposed part-cylindrical surfaces of the pair of limbs of the inner joint member and the part-spherical portion of the intermediate member received therebetween. Such bearing elements may have cylindrical surfaces on their outside and part-spherical surfaces on their inside so that they have surface contact (rather than line contact) with both the intermediate member and the limbs of the inner joint member. In this way it is possible to reduce wear in use. A pair of such sliding bearing elements associated with each intermediate member may be connected to form a unit which embraces the part-spherical portion of the intermediate member, to facilitate assembly in the joint and to prevent them from becoming displaced from between the limbs by moving angularly about the radius to the axis of the inner joint member. Alternatively, cooperating edges or guide surfaces, extending parallel to the radius to the rotational axis of the inner joint member, may be provided to prevent the sliding bearing elements from becoming displaced by such angular movement.

Instead of there being four relatively large balls associated with each pair of tracks in the outer joint member and intermediate member assembly, there may be a larger number of smaller balls. For example, each projection of each intermediate member may have a row of balls in axial succession engaging in each of its tracks and the facing tracks of the outer joint member. Alternatively, each side of each projection may have parallel tracks each engaged by one or more rolling members. In principle, it is alternatively possible to use needle rollers as rolling members.

Further features of the invention relate to the means by which the rolling members and cage of each intermediate member are centred relative thereto in the direction axially of the outer joint member. In a preferred embodiment, this may be achieved by providing means for resiliently supporting the cages relative to the intermediate members, which resilient means preferably is arranged on the radially outermost part of each cage and intermediate member.

Alternatively, such centering of the cages may be achieved by suitably configuring the tracks in the intermediate members and/or the outer joint member. In particular, variation in the depth of the tracks with axial distance therealong may be arranged to achieve the required centering of the cages. In one embodiment, the centre lines of the tracks in each of the projections of each intermediate member may be inclined to one another symmetrically about the longitudinal central axis of the intermediate member, the tracks in both projections of the intermediate member being symmetrical about the part-spherical portion thereof.

In a yet further alternative, the centre lines of the tracks in one projection of each intermediate member may be parallel to one another, but inclined to the longitudinal central axis of the intermediate member, the centre lines of the tracks in the other projection being parallel to one another but oppositely inclined to the central axis.

Instead of the tracks on the intermediate element being inclined as above referred to, the tracks in the projections of the intermediate elements may all be parallel to one another and not inclined, with the same result being achieved by suitably inclining the tracks in the outer joint member instead of their being parallel to the axis thereof.

A further advantageous embodiment, giving improved accuracy of guidance and ease of operation as well as eliminating the need for axially centering the rolling members relative to the part-spherical portion of the intermediate member, provides that each of the projections of each intermediate member has a plurality of rolling members guided in a closed ring. Such a ring of rolling members requires a specially designed cage to retain the rolling members at the free end of the projection, and an aperture extending transversely through the projection adjacent the part-spherical portion of the intermediate member. To increase the capacity of the joint, it would be possible for two such rings of rolling members to be provided.

In such a joint, the possible axial displacement between the joint members is not limited by the length of the tracks provided in the outer joint member. Axial displacement is possible until one projection of each intermediate member partially emerges from the outer joint member at its open end.

BRIEF DESCRIPTION OF THE DRAWINGS

The invention will now be described by way of example with reference to the accompanying drawings, wherein:

FIGS. 2A and 2B to FIGS. 5A and 5B are respective sections as FIGS. 1A and B, through further embodiments of joint according to the invention.

DESCRIPTION OF PREFERRED EMBODIMENT

Figure 1A:
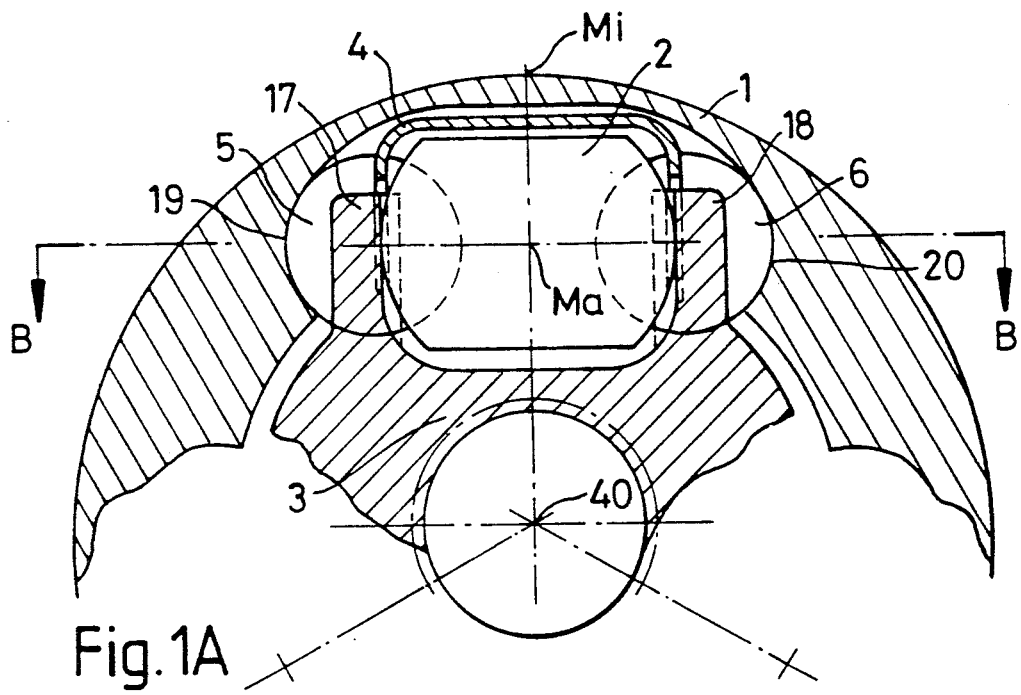
FIGS. 1A and 1B are respectively transverse and tangential sections through part of a first embodiment of universal joint according to the invention.
Figure 1B:
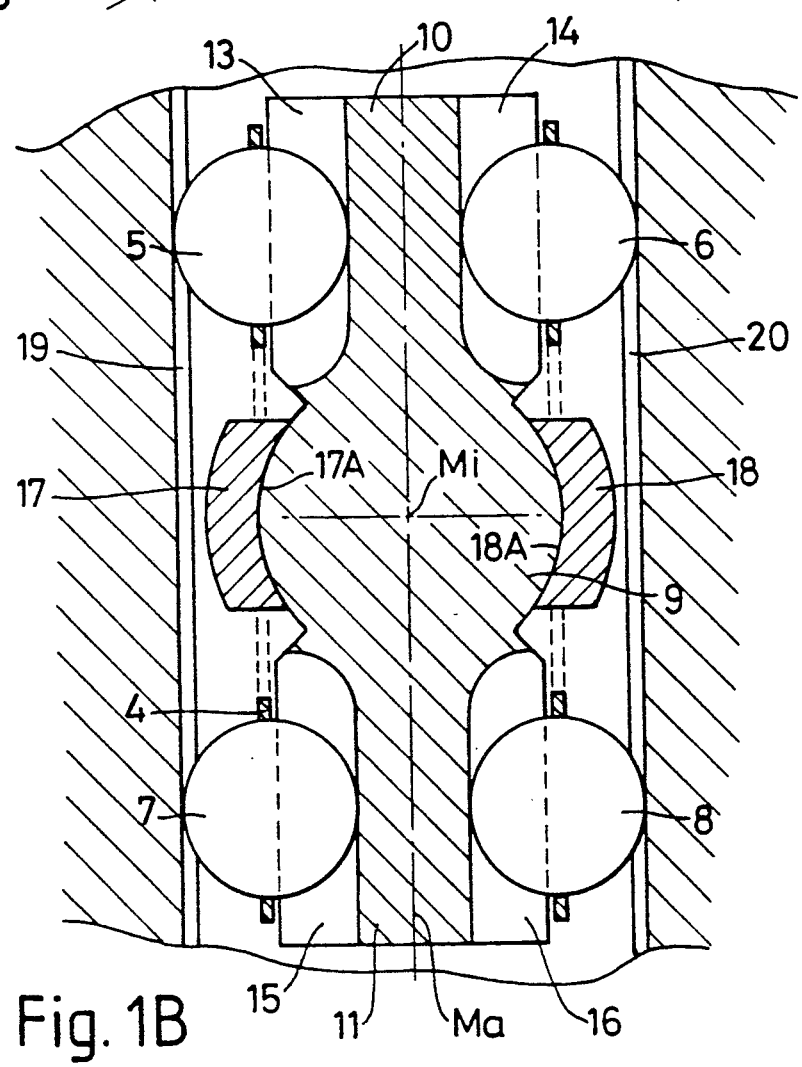

Referring firstly to FIGS. 1A and 1B of the drawing, these show part of a first embodiment of universal joint according to the invention. The section shown in FIG. 1B is indicated by the section line B—B in FIG. 1A. The joint is shown in the non-articulated condition. It will be appreciated that the complete joint comprises three of the assemblies to be described hereafter, equally circumferentially spaced about the rotational axis of the non-articulated joint.

The joint comprises an outer joint member 1 and an inner joint member 3. As the joint is not articulated, the rotational axes of the joint members coincide and are indicated at 40. The outer joint member is generally in the form of a sleeve, open at one end and having in its interior three pairs of tracks of which those of one pair are indicated at 19, 20, facing one another.

The inner joint member has three parts which extend radially outwardly relative to its rotational axis, each such part comprising two spaced limbs 17, 18 which are parallel to the radius indicated at Mi to the axis 40. These limbs 17, 18 have respective opposed surfaces 17a, 18a which are parts of a cylindrical surface with the central axis Mi.

Between the limbs 17, 18 there is received a part-spherical portion 9 of an intermediate member, the portion p having part-spherical surfaces which engage between the part-cylindrical surfaces 17a, 18a so that the intermediate member 2 is able to move radially relative to the inner joint member and articulate universally to a limited extent. The intermediate member 2 further comprises projections 10, 11 which extend in opposite directions from the part-spherical portion 9 thereof, and each projection 10, 11 has a pair of oppositely disposed tracks 13, 14; 15, 16, respectively. The tracks 13, 15 face the track 19 in the outer joint member, and the tracks 14, 16 face the track 20 in the outer joint member.

Two rolling members in the form of balls 5, 6 are provided for the projection 10, engaging in the facing tracks 13, 19 and 14, 20 of the intermediate member 2 and the outer joint member respectively. Similarly two balls 7, 8 are provided engaging the facing tracks 15, 19 and 16, 20. A cage 4, which is of sheet metal, generally of U-shaped cross-section with parallel lateral parts connected by a base part as seen in FIG. 1A, and provided with apertures in which the balls 5, 6, 7, 8 are received, constrains the balls so that they remain correctly spaced from one another. The lateral parts of the cage have, between the parts thereof with the ball-receiving apertures, recesses to accommodate the limbs 17, 18 of the inner joint member, and the distance by which the cage can move axially relative to the inner joint member is determined by the axial extent of such recesses. The boundaries of such recesses provide axial stops for the cage.

Thus, in use, torque is transmitted between the inner and outer joint members by way of the arrangements of intermediate members and balls as above described. When the joint rotates in the articulated condition, the intermediate members oscillate axially relative to the outer joint member as the balls roll along the tracks therein. At the same time, the intermediate members pivot and move radially between the limbs 17, 18 of the inner joint member.

Figure 2A:
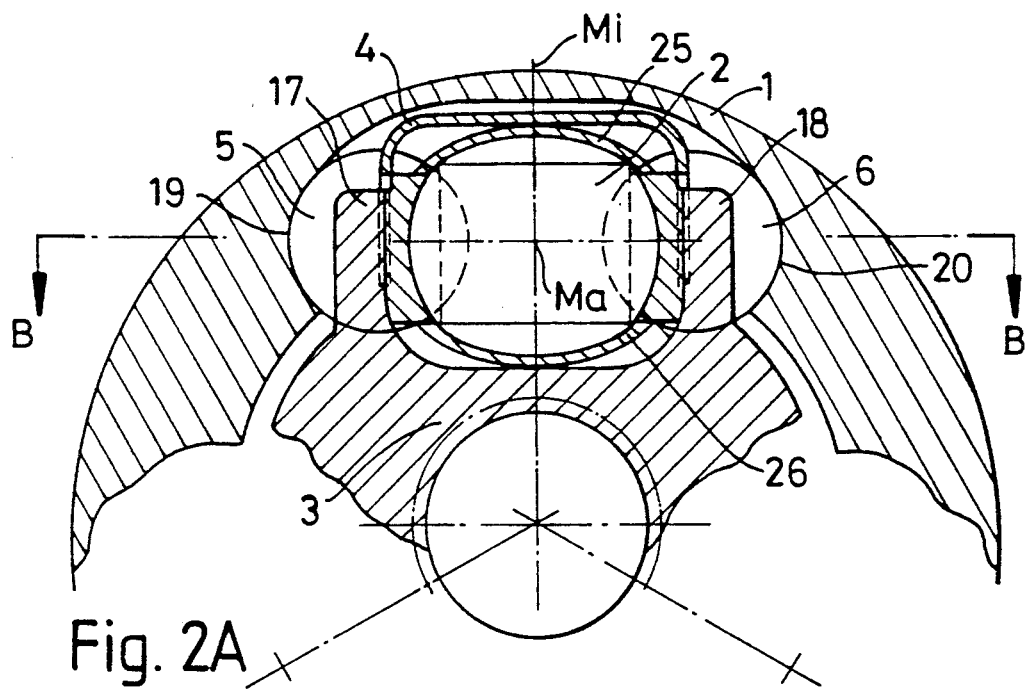
Figure 2B:
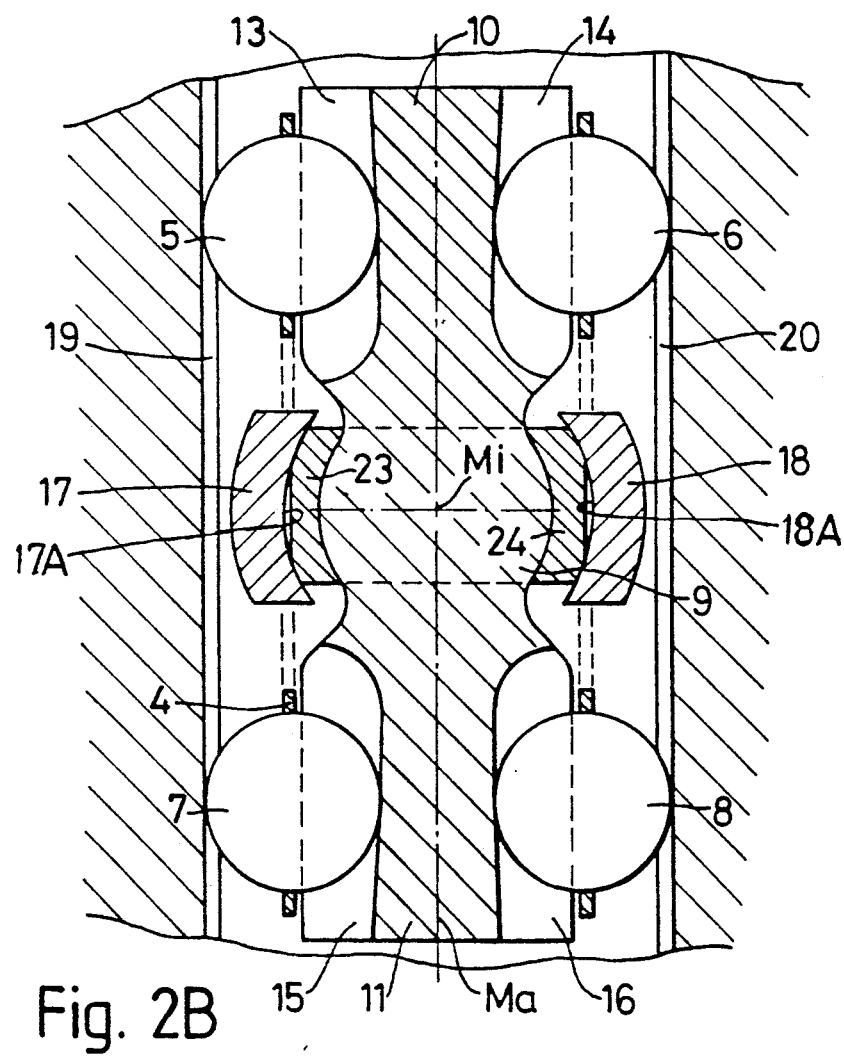

In FIGS. 2A and 2B of the drawings there is shown a further embodiment of joint according to the invention, whose basic parts are the same as those above described and therefore are indicated by the same reference numerals. In this case, however, instead of the part-spherical portion 9 of the intermediate member 2 engaging directly between the opposed part-cylindrical surfaces of the limbs 17, 18, a pair of bearing elements 23, 24 are interposed therebetween. The bearing elements 23 an 24 have external part-cylindrical surfaces and internal part-spherical surfaces which engage the facing part-cylindrical surfaces 17a, 18a of the limbs 17, 18, and the part-spherical portion 9 of the intermediate member 2, respectively. The bearing elements 23, 24 are connected by webs 25, 26, to hold them together, facilitate their assembly in the joint, and prevent them from moving angularly about the radius Mi to become displaced from their operative positions.

A further difference of the FIG. 2 embodiment from that of FIG. 1 is that means is provided axially to centre the cage 4 and balls 5 to 8 relative to the intermediate member 2. The tracks 13, 14 in the projection 10 are of decreasing depth with increasing distance away from the part-spherical portion 2 of the intermediate member 2, the centre lines of the tracks being equally inclined to the central longitudinal axis Ma of the intermediate member 2. The tracks 15, 16 in the other projection 11 of the intermediate member 2 are similarly configured so that the intermediate member is symmetrical about its part-spherical portion 9. This change in track depth, shown to an exagerated extent in FIG. 2B, tends to cause centralisation of the cage and balls relative to the intermediate member.

Figure 3A:
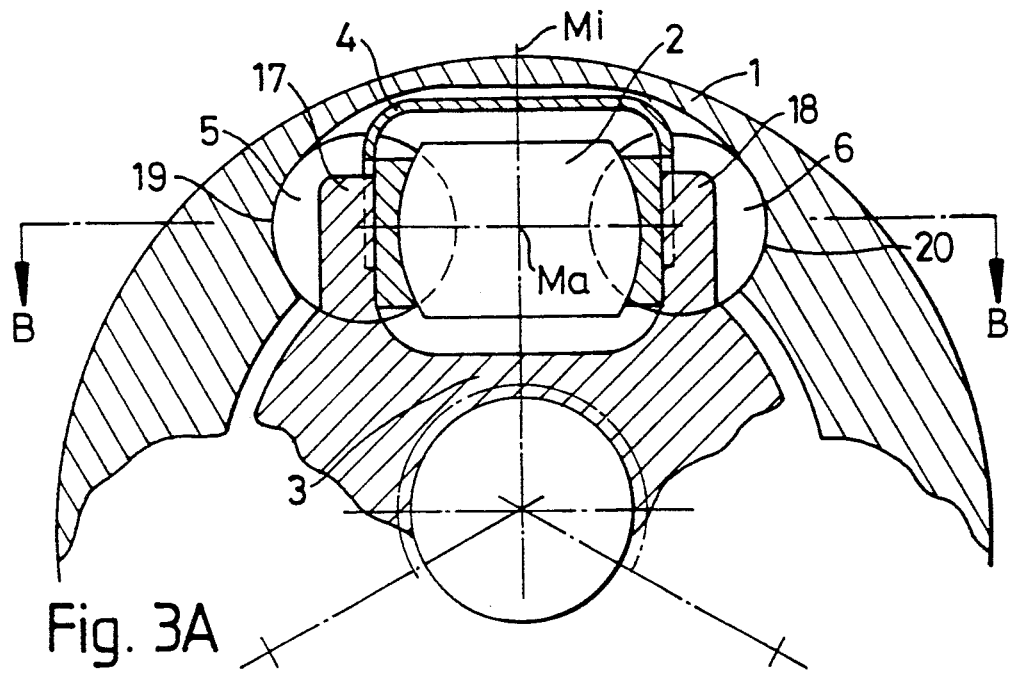

Referring now to FIGS. 3A and B of the drawings, these show an embodiment of basically similar configuration to that above described in relation to FIG. 2. In this case, however, the bearing elements 23, 24 are not joined to one another by webs, but are totally separate components. To prevent them from becoming displaced in use, the bearing elements have edges or guide surfaces 27, 28, 29, 30 which cooperate with the limbs 17, 18 so that the bearing elements can move in no sense other than radially relative to the inner joint member.

Figure 3B:
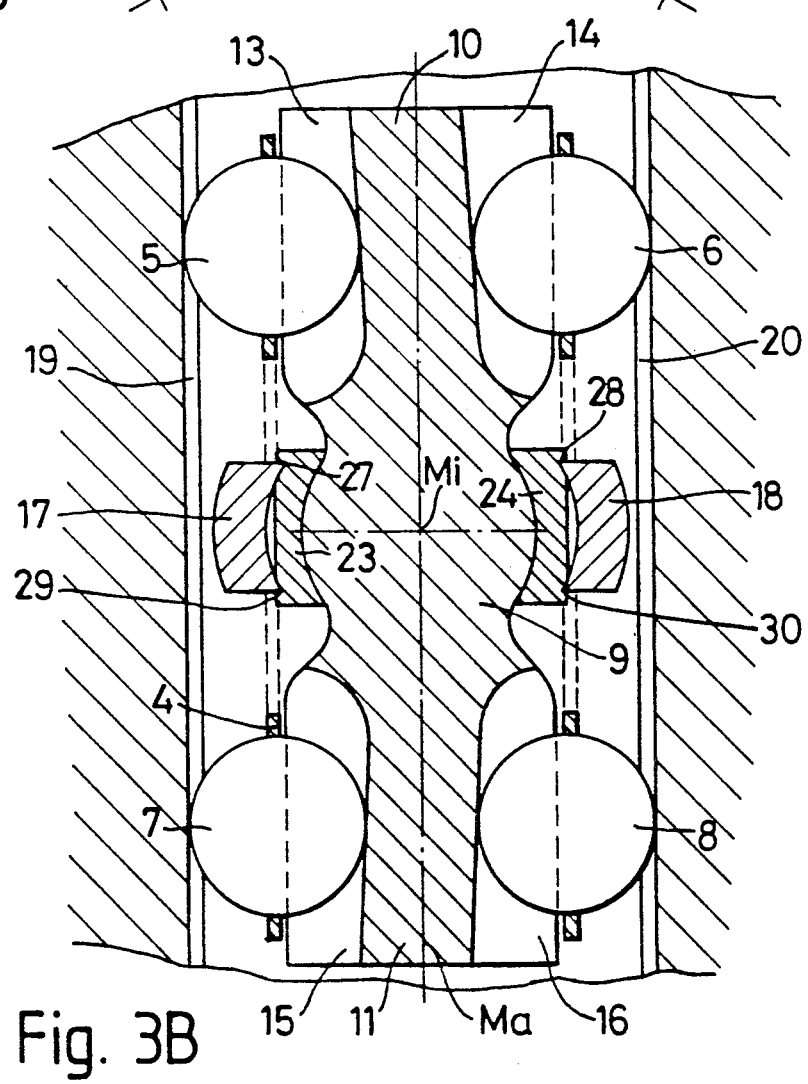

For centering the cage and balls relative to the intermediate member, the embodiment of FIG. 3 has, as clearly shown to a somewhat exaggerated extent in FIG. 3B, inclined tracks 13, 14, 15, 16 in the intermediate member. In this embodiment, however, the centre lines of tracks 13, 14 are parallel to one another rather than diverging from one another, whilst the centre lines of tracks 15, 16 are also parallel to one another but inclined in the opposite sense to the central axis Ma of the intermediate member. Once again, however, the effect of such a slight change in track depth is to centralise the assembly of cage and balls relative to the intermediate member.

FIG. 4 shows an embodiment with a different means for centering the balls relative to the intermediate member. In this case, the cage 4, in its radially outermost part, is provided with a portion 31 defining a recess bounded axially by pressed tags. A recess 32 is provided in the radially outwardly facing part of the part-spherical portion 9 of the intermediate member 2, which recess has a central portion, and end portions of relatively smaller width to receive the tags pressed out of the cage. A coil spring 22 is disposed in these facing recesses, so that if the cage is displaced axially relative to the intermediate member, the spring is compressed to provide a force to centre the cage.

In all the embodiments above described, two balls are provided one on each side of each projection 10, 11 of the intermediate member 2. If required, more balls of smaller diameter could be provided, suitably constrained by a cage of appropriate configuration.

Figure 5A:
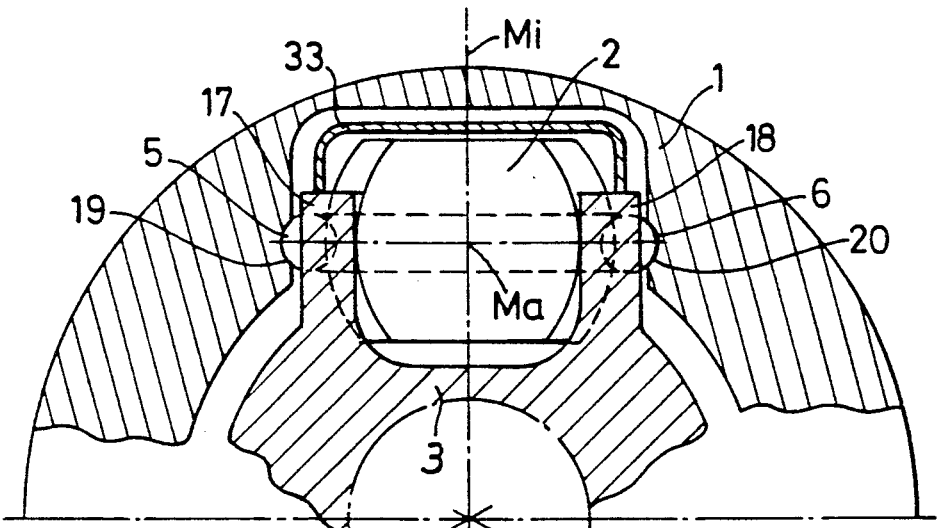
Figure 5B:
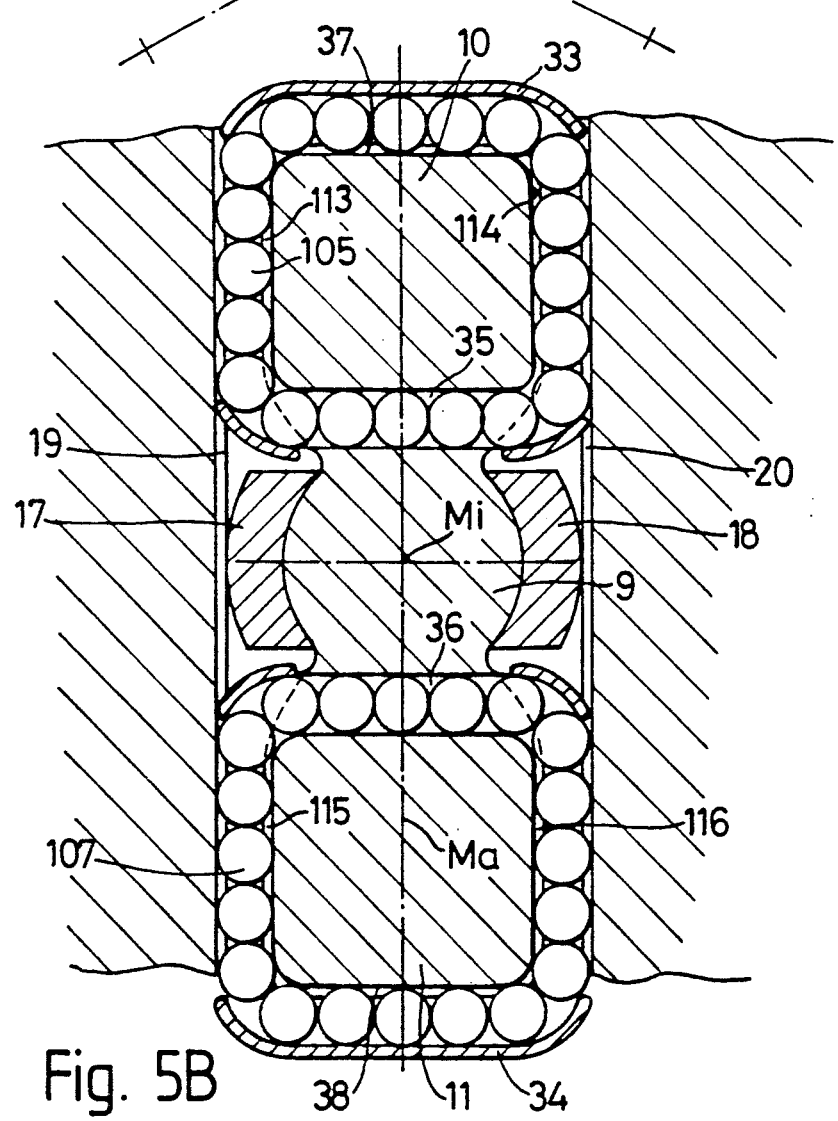

Referring finally now to FIGS. 5A and 5B of the drawings, these show a joint in which the intermediate member 2 has a continuous ring of balls associated with each projection thereof. The projection 10 of the intermediate member has, on opposite sides, tracks 113, 114, and adjacent the part-spherical portion 9 of the intermediate member 2 a bore 35 extending transversely through the projection joins these tracks. A track 37 extends across the free end of the projection, and there are curved transitions between the tracks 113, 114 and the bore 35 and the end track 37. Similarly the other projection 11 of the intermediate member 2 has tracks 115, 116 joined by a transverse bore 36 and an end track 38. Individual cages 33, 34 are provided for the projections 10, 11 respectively, and each cage 33, 34 extends beyond the free end of the projection to provide a closed path for the ring of balls 105, 107 respectively.

When this embodiment of joint is in use, the balls 105, 107 are free to circulate around the closed rings in which they are constrained. Two such rings of balls may be provided for each projection of the intermediate member, spaced from one another radially of the joint.

I claim:

1. A plunging constant velocity ratio universal joint, comprising:
   an outer joint member, generally in the form of a sleeve having a rotational axis and three pairs of tracks in its interior, the pairs being equally spaced circumferentially about said rotational axis and extending substantially parallel thereto;
   an inner joint member having a rotational axis and parts extending radially outwardly relative thereto, into the track pairs of the outer joint member;
   each of said parts of the inner joint member comprising a pair of limbs having opposed part-cylindrical surfaces;
   three intermediate members, each comprising a part-spherical portion received between said opposed part-cylindrical surfaces of a respective said pair of limbs, for radial movement and articulation relative to the inner joint member;
   each intermediate member further comprising projections extending in opposite directions axially of the outer joint member from its part-spherical portion, each projection having a pair of oppositely disposed tracks facing the tracks of the respective pair thereof in the outer joint member;
   at least two rolling members for each projection of each intermediate member, engaging in the facing tracks of the projections and outer joint member;
   and respective cages for constraining the rolling members of each intermediate member relative to one another.

2. A joint according to claim 1 further comprising respective pairs of sliding bearing elements interposed between each pair of limbs of the inner joint member and the part-spherical portion of the intermediate member received therebetween, each bearing element comprising an internal part-spherical surface and an external part-cylindrical surface.

3. A joint according to claim 2 wherein the sliding bearing elements of each pair are connected to one another by webs which embrace the part-spherical portion of the intermediate member.

4. A joint according to claim 2 wherein said sliding bearing elements and limbs have co-operating guide surfaces, for preventing the bearing elements from becoming displaced from between the limbs.

5. A joint according to claim 1 wherein said rolling members comprise balls.

6. A joint according to claim 1 comprising a plurality of rolling members in axial succession engaging each track in each projection of the intermediate members.

7. A joint according to claim 1 wherein each side of each projection has parallel tracks each engaged by at least one rolling member.

8. A joint according to claim 1 wherein each cage is of U-shape in cross-section, comprising lateral parts connected by a base part disposed radially outwardly of the intermediate member.

9. A joint according to claim 8 wherein said lateral parts of each cage comprise recesses wherein the respective limbs of the inner joint member are received, the boundaries of said recesses constituting axial stops for limiting axial movement of the cage.

10. A joint according to claim 1, comprising spring means for centralising the cages relative to the intermediate members.

11. A joint according to claim 1 wherein said tracks in at least one of the intermediate members and the outer joint member are of a depth varying with axial distance therealong, for centralising the cages relative to the intermediate members.

12. A joint according to claim 11 wherein the centre lines of the tracks in each of the projections of each intermediate member are inclined to one another symmetrically about a longitudinal central axis of the intermediate member, the tracks in both projections of the intermediate member being symmetrical about the part-spherical portion thereof.

13. A joint according to claim 11 wherein the centre lines of the tracks in one projection of each intermediate member are parallel to one another and inclined to the longitudinal central axis of the intermediate member, and the centre lines of the track in the other projection of each intermediate member are parallel to one another but oppositely inclined to the central axis.

14. A joint according to claim 1 wherein each of the projections of each intermediate member is provided with a plurality of rolling members guided in a closed ring, a cage retaining the rolling members at the free end of the projection and an aperture extending transversely through the projection adjacent the part-spherical portion of the intermediate member.

15. A joint according to claim 14, comprising two said rings of rolling members, spaced from one another in the direction radially of the joint.

* * * * *